United States Patent
Lee et al.

(10) Patent No.: US 10,995,444 B2
(45) Date of Patent: May 4, 2021

(54) WASHING MACHINE

(71) Applicant: Samsung Electronics Co., Ltd., Suwon-si (KR)

(72) Inventors: Jung Hee Lee, Suwon-si (KR); Takahiro Nakashima, Minoh (JP); Yoshinari Shimada, Minoh (JP); Kazushi Mori, Minoh (JP); Jeong Hoon Kang, Seoul (KR); Min Sung Kim, Yongin-si (KR); Dong Ha Jung, Yongin-si (KR); Kwan Woo Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 15/777,513

(22) PCT Filed: Nov. 8, 2016

(86) PCT No.: PCT/KR2016/012796
§ 371 (c)(1),
(2) Date: May 18, 2018

(87) PCT Pub. No.: WO2017/086644
PCT Pub. Date: May 26, 2017

(65) Prior Publication Data
US 2018/0347093 A1    Dec. 6, 2018

(30) Foreign Application Priority Data
Nov. 18, 2015   (KR) .......................... 10-2015-0161518

(51) Int. Cl.
*D06F 37/20*     (2006.01)
*D06F 37/04*     (2006.01)
(Continued)

(52) U.S. Cl.
CPC ............. *D06F 37/206* (2013.01); *D06F 37/04* (2013.01); *D06F 37/30* (2013.01); *F16H 55/36* (2013.01);
(Continued)

(58) Field of Classification Search
CPC ........ D06F 37/04; D06F 37/206; D06F 37/30; D06F 37/00; F16H 55/36; F16H 57/0025; F16H 2055/366
See application file for complete search history.

(56) References Cited

U.S. PATENT DOCUMENTS 3,116,644 A * 1/1964 Bochan .................. F16H 55/56
                                                              474/27
3,845,642 A * 11/1974 Cochran ................. D06F 13/02
                                                              68/23.7
(Continued)

FOREIGN PATENT DOCUMENTS

CN         1230494 A    10/1999
CN         2574920 Y     9/2003
(Continued)

OTHER PUBLICATIONS

Communication pursuant to Article 94(3) EPC dated Apr. 30, 2019 in connection with European Patent Application No. 16 866 596.6, 4 pages.
(Continued)

*Primary Examiner* — Benjamin L Osterhout

(57) ABSTRACT

The washing machine of the present disclosure includes an improved pulley for reducing the noise generated in the pulley. When the shaft is inserted into the shaft insertion hole, at least a part of the shaft is closely contacted with the shaft insertion hole to minimize the tolerance between the shaft and the shaft insertion hole, and the rotation shaft of the pulley and the center axis of the shafts may be made to coincide with each other, so that the noise generated by the
(Continued)

rotation of the pulley can be effectively reduced. In addition, the spoke of the pulley includes the curved portion, thereby reducing the friction with the air and effectively reducing noise due to friction with air.

20 Claims, 15 Drawing Sheets

(51) Int. Cl.
    *F16H 55/36*     (2006.01)
    *F16H 57/00*     (2012.01)
    *D06F 37/30*     (2020.01)
    *D06F 37/00*     (2020.01)

(52) U.S. Cl.
    CPC ......... *F16H 57/0025* (2013.01); *D06F 37/00* (2013.01); *F16H 2055/366* (2013.01)

(56) References Cited

U.S. PATENT DOCUMENTS

| | | | |
|---|---|---|---|
| 5,509,284 A * | 4/1996 | Hauser | D06F 37/40 192/12 BA |
| 2002/0134118 A1* | 9/2002 | Peachee | H02K 1/148 68/23 R |

FOREIGN PATENT DOCUMENTS

| | | |
|---|---|---|
| CN | 102756611 A | 10/2012 |
| CN | 203248667 U | 10/2013 |
| CN | 203371984 U | 1/2014 |
| CN | 204058918 U | 12/2014 |
| CN | 104691228 A | 6/2015 |
| EP | 1431439 A1 | 6/2004 |
| EP | 2557219 A1 | 2/2013 |
| GB | 651603 A | 4/1951 |
| JP | S58123954 U | 8/1983 |
| JP | H09155920 A | 6/1997 |
| KR | 20-1998-0064027 U | 11/1998 |
| KR | 10-2001-0003902 A | 1/2001 |
| KR | 10-1054422 B1 | 8/2011 |
| WO | 2010141490 A2 | 12/2010 |

OTHER PUBLICATIONS

European Patent Office, "Supplementary European Search Report," Application No. EP16866596.6, dated Aug. 31, 2018, 9 pages.
ISA/KR, "International Search Report and Written Opinion of the International Searching Authority," International Application No. PCT/KR2016/012796, dated Jan. 26, 2017, 13 pages.
The First Office Action in connection with Chinese Application No. 201680067569.7 dated Apr. 17, 2020, 21 pages.
The Second Office Action dated Nov. 17, 2020 in connection with Chinese Application No. 201680067569.7, 18 pages.

* cited by examiner

WASHING MACHINE

CROSS-REFERENCE TO RELATED APPLICATIONS AND CLAIM OF PRIORITY

This application is a 371 National Stage of International Application No. PCT/KR2016/012796, filed Nov. 8, 2016, which claims priority to Korean Patent Application No. 10-2015-0161518, filed Nov. 18, 2015, the disclosures of which are herein incorporated by reference in their entirety.

TECHNICAL FIELD

The present disclosure relates to a washing machine, more particularly to a pulley of a washing machine.

BACKGROUND ART

Generally, a washing machine is an apparatus for washing laundry by performing washing, rinsing and spin-drying.

Washing machines are classified into a pulsator type in which a rotary plate having small blades is disposed on a lower side of a washing tub and rotated to generate water current, thereby washing laundry, an agitator type in which a large agitator having blades is disposed in the center of a washing tub and alternately rotated to generate water current at a regular interval, thereby washing laundry, and a drum type in which laundry is placed inside of a drum and the laundry is washed by an impact caused by the rotation of the drum and the detergency of a detergent.

The washing machine includes a cabinet, a tub installed in the cabinet to store washing water, a washing tub rotatably provided in the tub and in which laundry is accommodated, a driving device configured to drive the washing tub, a water supply device configured to supply water to the tub, and a drain device configured to discharge washing water from the washing tub to the outside of the cabinet when the washing is completed.

In the drum washing machine, a pulley configured to transmit a torque of a motor to a drum is provided to rotate the drum. However, when the pulley is rotated at a high speed in association with the rotation of the motor through a belt, there may be a problem of noise caused by friction of air and a separation, which is generated during the assembly.

SUMMARY

The present disclosure is directed to providing a washing machine provided with a pulley having an improved structure to reduce noise.

In accordance with one aspect of the present disclosure a washing machine includes a body, a drum rotatably installed inside the body, a pulley configured to transmit a torque to the drum, and a shaft configured to connect the drum to the pulley, and the pulley comprises a shaft insertion hole to which the shaft is inserted and the shaft insertion hole comprises an inner circumferential surface extended obliquely with respect to a rotation axis of the pulley.

The shaft insertion hole includes a first toothed portion provided in the inner circumferential surface of the shaft insertion hole, and the shaft includes a second toothed portion disposed on an outer circumferential surface of one side of the shaft, which is to be inserted into the shaft insertion hole, and configured to be engaged with the first toothed portion, and the first toothed portion comprises an inner circumferential surface extended obliquely with respect to the rotation axis of the pulley.

The first toothed portion has a tapered shape.

When the shaft is coupled to the shaft insertion hole by being inserted into the shaft insertion hole, at least one part of the first toothed portion is not in contact with the second toothed portion.

The first and second teethed portions include a crest protruding to the outside and a root concave to the inside, and a radius of at least one part of the crest of the first toothed portion is smaller than a radius of the crest of the second toothed portion.

The first toothed portion comprises a guide surface disposed in a direction into which the shaft is inserted, and formed in a diagonal shape to guide the insertion of the shaft.

The shaft insertion hole comprises a taper portion disposed on one side into which the shaft is inserted, and extended obliquely and outwardly with respect to the rotation axis of the pulley.

The taper portion is in surface contact with the shaft when the shaft is inserted in the shaft insertion hole.

The pulley comprises a hub provided with the shaft insertion hole, and a spoke extended from the hub in a radial direction of the pulley, and the spoke comprises a curved portion extended to the radial direction of the pulley.

The curved portion comprises a curved surface convex in a direction perpendicular to the radial direction of the pulley.

The spoke comprises a pair of extended portions extended in a direction of the rotation axis of the pulley, and each end of the pair of extended portions is connected by the curved portion.

The pair of extended portions include a first extended portion provided in the rotational direction of the pulley and a second extended portion opposite to the first extended portion with a space, and a width of the first extended portion is greater than a width of the second extended portion.

The spoke further comprises a third extended portion extended from an inner circumferential surface of the curved portion and disposed between the pair of extended portions.

The spoke comprises a first portion adjacent to the hub and a second portion adjacent to the outer side of the pulley, and a cross sectional area of the first portion in the direction of the rotation axis of the pulley is greater than a cross sectional area of the second portion.

When a direction toward the rotation axis of the pulley is defined as a first direction and a direction perpendicular to the rotation axis of the pulley is defined as a second direction, a cross section of the first portion is formed such that a length in the first direction is greater than a length in the second direction.

The decrease rate of the first direction is larger than the decrease rate of the second direction in the decrease rate of the cross-sectional area of the first portion and the second portion.

In accordance with one aspect of the present disclosure a washing machine includes a body, a drum rotatably installed inside the body, a pulley configured to transmit a torque to the drum, and a shaft configured to connect the drum to the pulley, and the pulley includes a shaft insertion hole to which the shaft is inserted and provided in a taper shape with respect to the shaft, and spoke extended from the shaft insertion hole to the outside of the pulley and having a curved portion extended to the radial direction of the pulley.

The shaft insertion hole comprises a first toothed portion provided in the inner circumferential surface of the shaft insertion hole, and the shaft comprises a second toothed portion disposed on an outer circumferential surface of one side of the shaft, which is to be inserted into the shaft insertion hole, and configured to be engaged with the first toothed portion, and the first toothed portion extended obliquely with respect to the rotation axis of the pulley.

When the shaft is coupled to the shaft insertion hole by being inserted into the shaft insertion hole, at least one part of the first toothed portion is not in contact with the second toothed portion.

The shaft insertion hole comprises a taper portion disposed on one side into which the shaft is inserted, and extended obliquely and outwardly with respect to the rotation axis of the pulley, and the taper portion is in surface contact with the shaft when the shaft is inserted in the shaft insertion hole.

The curved portion comprises a curved surface convex in a direction perpendicular to the radial direction of the pulley.

The spoke includes a first portion adjacent to the hub and a second portion adjacent to the outer side of the pulley, and a cross sectional area of the first portion in the direction of the rotation axis of the pulley is greater than a cross sectional area of the second portion.

When a direction toward the rotation axis of the pulley is defined as a first direction and a direction perpendicular to the rotation axis of the pulley is defined as a second direction, a cross section of the first portion is formed such that a length in the first direction is greater than a length in the second direction.

The washing machine according to the present disclosure can effectively reduce the noise, which is caused by the rotation, by improving a coupling structure between a pulley and a shaft.

The washing machine can effectively reduce the noise, which is caused by the friction, by reducing the friction with air by having a spoke of a pulley provided with a curved surface.

DETAILED DESCRIPTION

Figure 1:
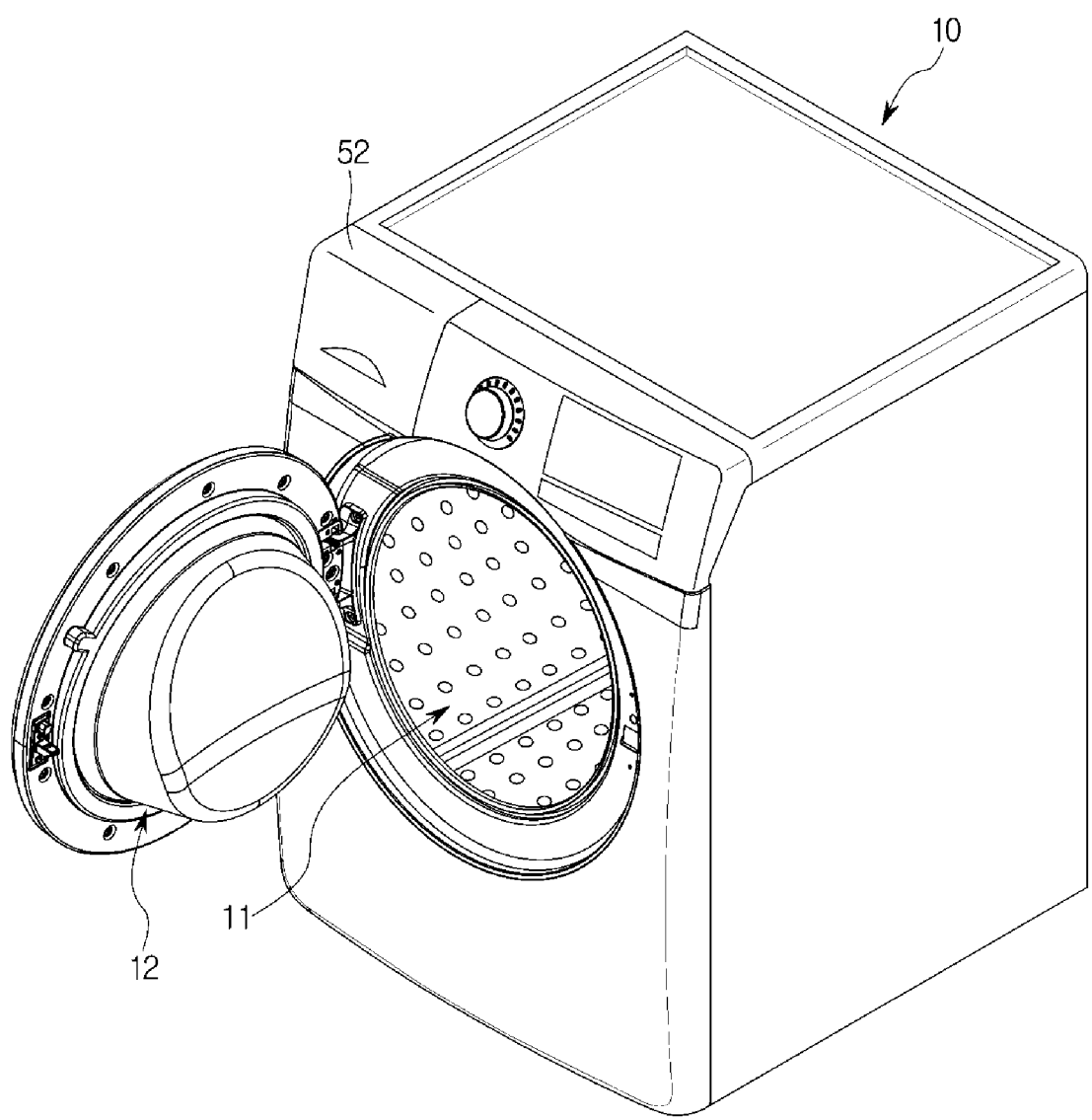
FIG. 1 is a perspective view of a washing machine according to an embodiment of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Terms ' upper side', 'upper', 'lower side' and ' lower' is defined by an upper and lower direction of a washing machine of FIG. 1 according to an embodiment, and thus an upper side of a body of the washing machine of FIG. 1 is referred to as an upper side, and a lower side thereof is referred to as a lower side.

In terms 'front side', 'rear side', ' front surface side', and 'rear surface side', a side in which a door of the washing machine of FIG. 1 is referred to as a front side and an opposite side thereof is referred to as a rear side.

Hereinafter, exemplary embodiments of the present disclosure will be described in detail with reference to the accompanying drawings.

Figure 2:
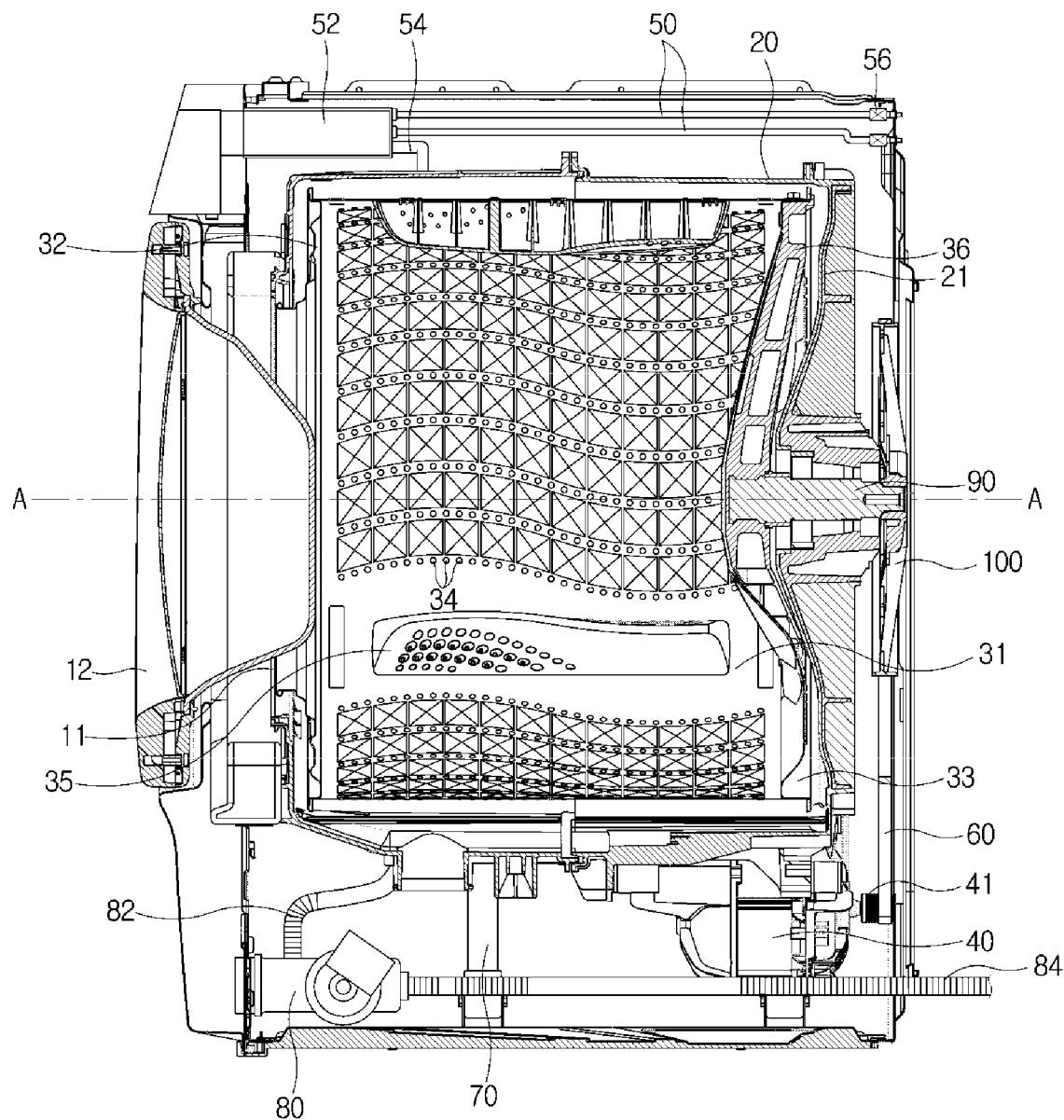
FIG. 2 is a side cross-sectional view of a washing machine according to an embodiment of the present disclosure.
Figure 3:
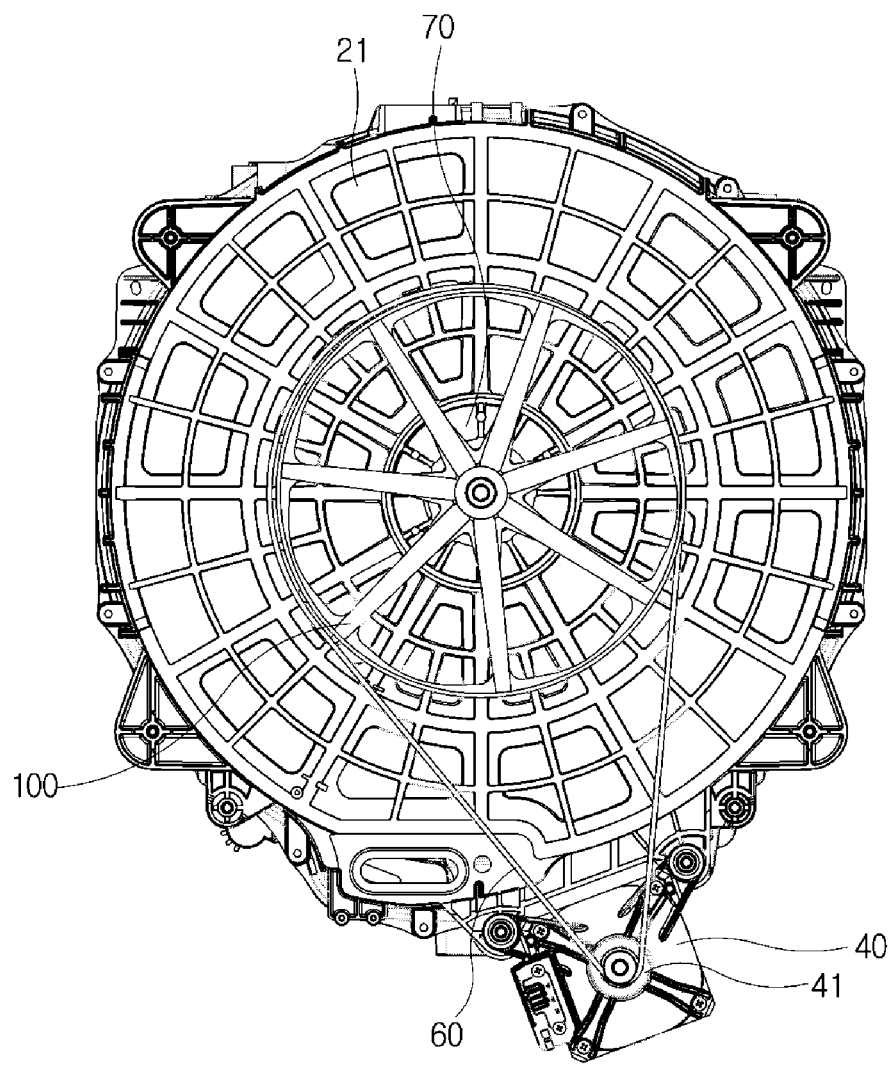
FIG. 3 is a rear view of a part of the composition of a washing machine according to an embodiment of the present disclosure.
Figure 4:
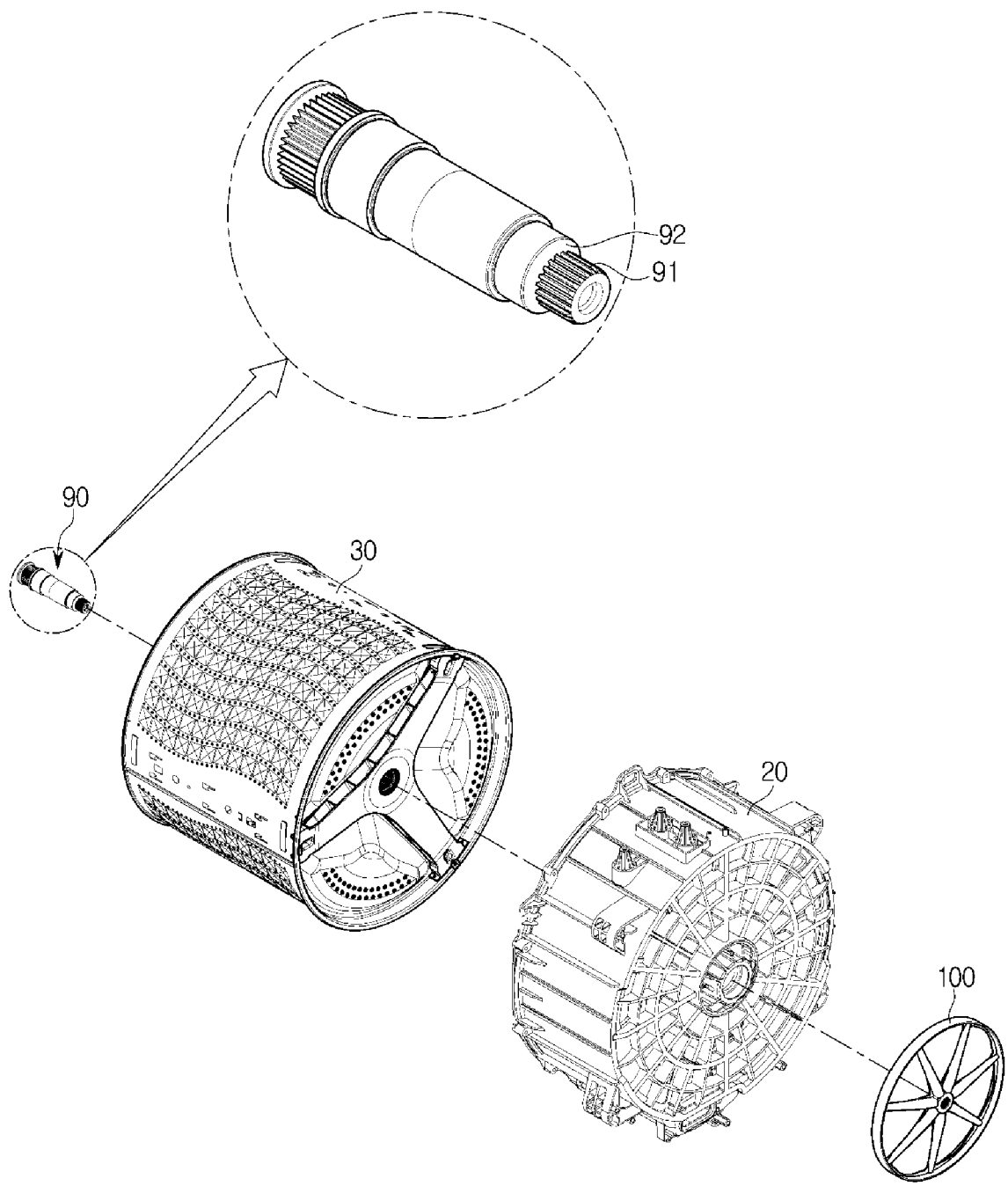
FIG. 4 is an exploded perspective view of a washing machine according to an embodiment of the present disclosure.

FIG. 1 is a perspective view illustrating a washing machine according to an embodiment, FIG. 2 is a cross-sectional view illustrating the washing machine of FIG. 1, FIG. 3 is a rear view illustrating some components of the washing machine according to an embodiment, and FIG. 4 is an exploded-perspective view illustrating the washing machine according to an embodiment.

As illustrated in FIGS. 1 to 4, the washing machine 1 may include a body 10 forming an outer appearance, a tub 20 installed inside the body 10, a drum 30 rotatably installed inside the tub 20, and a driving motor 40 configured to drive the drum 30.

At the front surface of the body 10, an inlet 11 is disposed to allow a user to input laundry into the drum 30. The inlet 11 is opened/closed by a door 12 installed at the front surface of the body 10.

At an upper portion of the tub 20, a water supply pipe 50 is installed to supply washing water to the tub 20. One side of the water supply pipe 50 is connected to a water supply valve 56, and the other side of the water supply pipe 50 is connected to a detergent box 52.

The detergent box 52 is connected to the tub 20 through a connecting pipe 54. The water supplied through the water supply pipe 50 passes through the detergent box 52, and is supplied to an inside of the tub 20 along with detergent.

The tub 20 is supported by a damper 70. The damper 70 connects a lower surface of the inner side of the body 10 to an outer surface of the tub 20.

The drum 30 includes a cylindrical portion 31, a front plate 32 disposed in front of the cylindrical portion 31, a rear plate 33 disposed in the rear side the cylindrical portion 31. On the front plate, an opening is disposed for the input of the laundry, and to the rear plate 33, a shaft 90 configured to transmit power of the driving motor 40 is connected. A flange shaft 36 by which the shaft 90 is supported may be mounted to the rear plate 33.

At a circumference of the drum 30, a plurality of penetrating holes 34 is disposed for the flow of washing water, and at an inner circumferential surface of the drum 30, a plurality of lifters 35 is installed so that the rise and the fall of the laundry may occur upon the rotation of the drum 30.

The drum 30 and the driving motor 40 are connected to each other by the shaft 90 and thus according to the connection type between the shaft 90 and the driving motor 40, the washing machine may be classified into a direct driving type in which the shaft 90 is directly connected to the driving motor 40 to rotate the drum 30 and an indirect driving type in which the shaft 90 is connected to the driving motor 40 through a pulley 100 to drive the drum 30.

The washing machine 1 according to an embodiment may be provided with an indirect driving type, but is not limited thereto. Accordingly, the technical features of the present disclosure are applicable to the direct driving type.

One end of the shaft 90 is connected to the rear plate 33 of the drum 30, and the other end of the shaft 90 is extended outwardly of a rear portion 21 of the tub 20. The other end of the shaft 90 may be inserted into the pulley 100 to obtain a driving force from the driving motor 40. A description thereof will be described in detail later.

Further, a motor pulley 41 is disposed on a rotation axis of the driving motor 40. A drive belt 60 is provided between the motor pulley 41 and the pulley 100 and the shaft 90 may be driven by the drive belt 60.

The driving motor 40 is disposed on one side of the lower portion of the tub 20 and the drive belt 60 is rotated clockwise or counterclockwise in the vertical direction of the tub 20 so as to drive the shaft 90.

On the rear portion 21 of the tub 20, a bearing housing 70 is installed to rotatably support the shaft 90. The bearing housing 70 may be formed of an aluminum alloy. When the tub 20 is formed by the injection molding, the bearing housing 70 may be inserted into the rear portion 21.

In the lower side of the tub 20, a drain pump 80 configured to discharge water from the tub 20 to the outside of the body 10, a connecting hose 82 connecting the tub 20 to the drain pump 80 to move the water of the tub 20 to the drain pump 80, and a discharge hose 84 configured to guide water, which is pumped by the drain pump 80, to the outside of the body 10 are provided.

A control panel and a printed circuit board assembly (not shown) are provided on the upper surface of the body 10 so that a user can control the operation of the washing machine 1.

Hereinafter the pulley 100 and a coupling structure between the pulley 100 and the shaft 90 will be described in detail.

Figure 5:
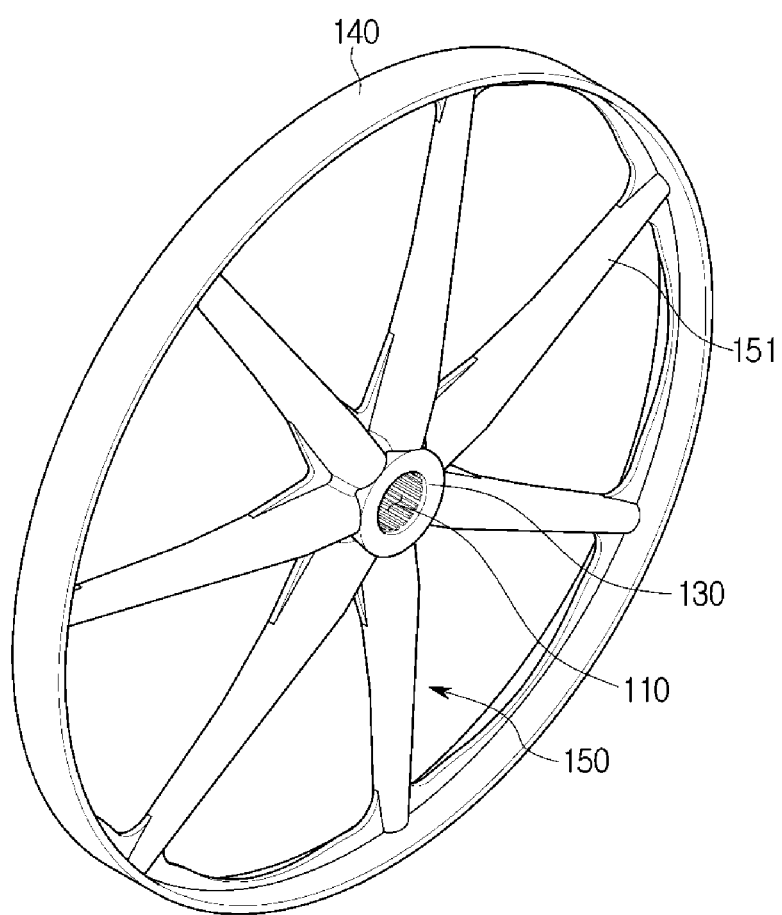
FIG. 5 is a perspective view of a pulley of a washing machine according to an embodiment of the present disclosure.
Figure 6:
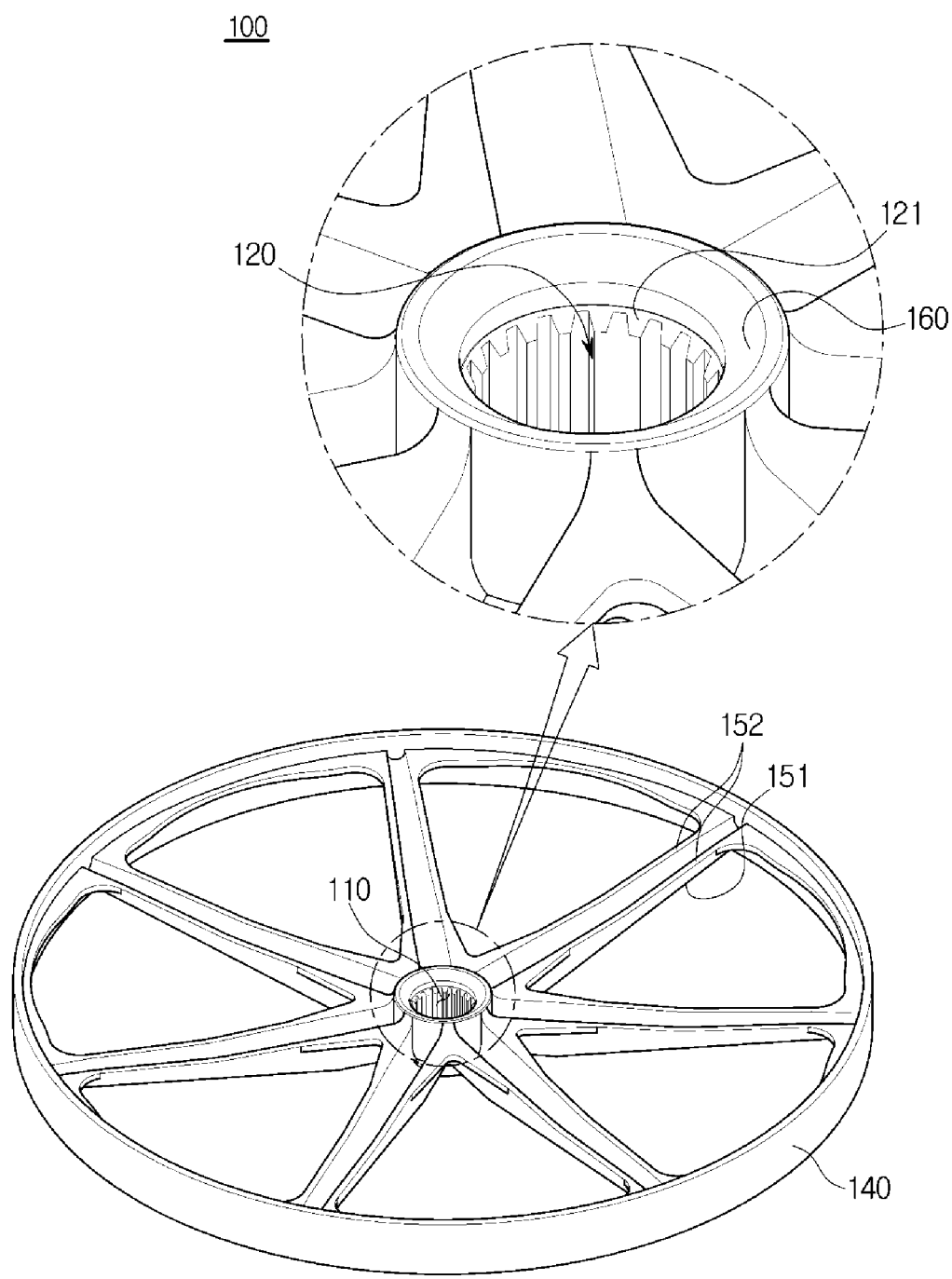
FIG. 6 is a rear perspective view of a pulley of a washing machine according to an embodiment of the present disclosure.
Figure 7:
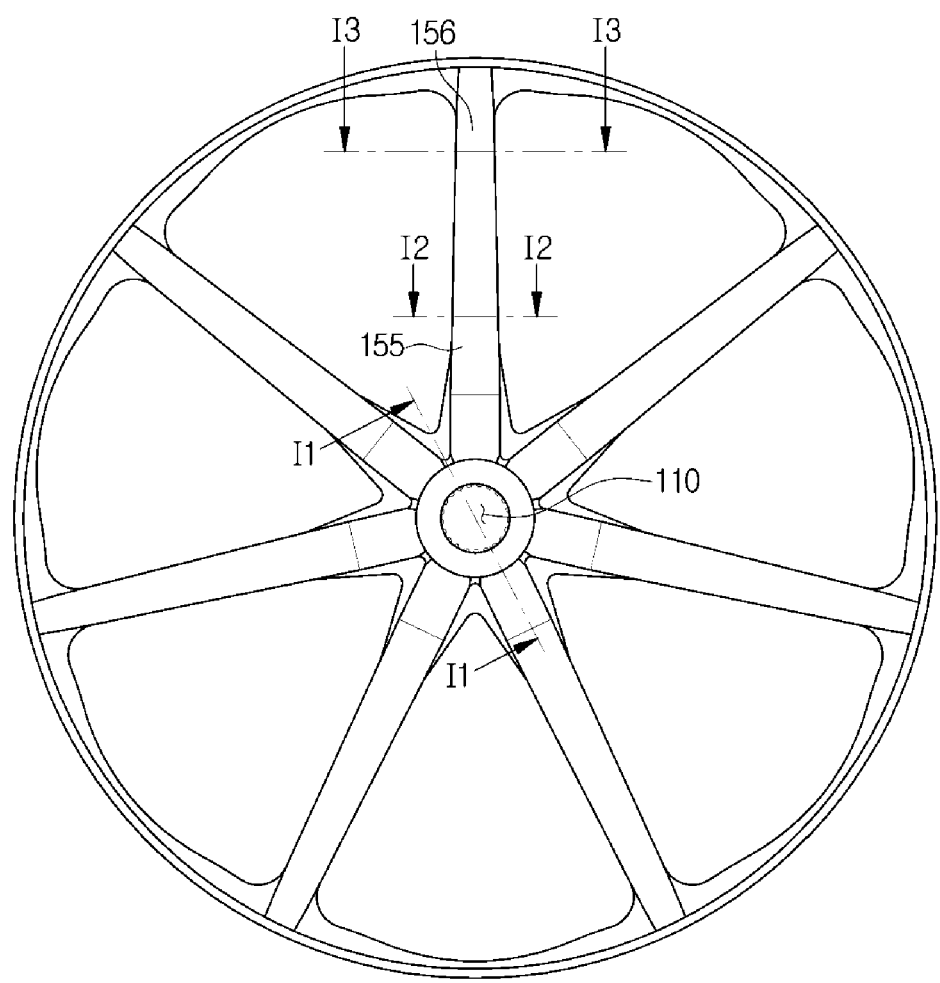
FIG. 7 is a rear view of a pulley of a washing machine according to an embodiment of the present disclosure.
Figure 8:
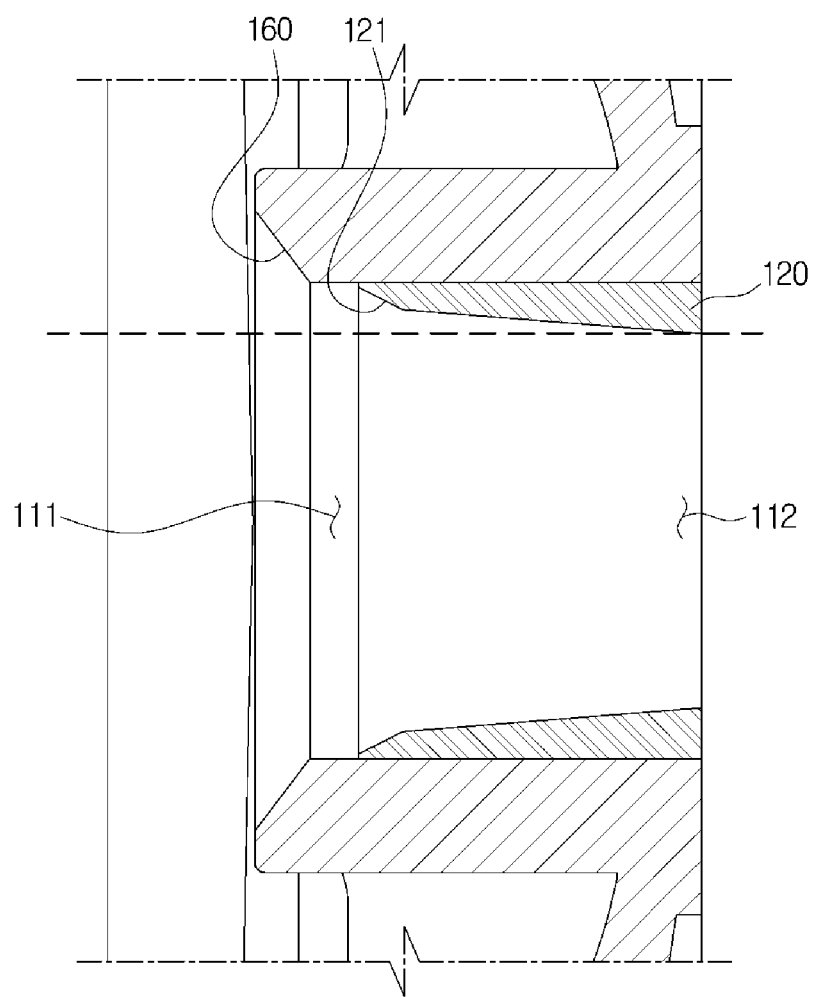
FIG. 8 is a sectional view taken along the line I1-I1 shown in FIG. 7.
Figure 9:
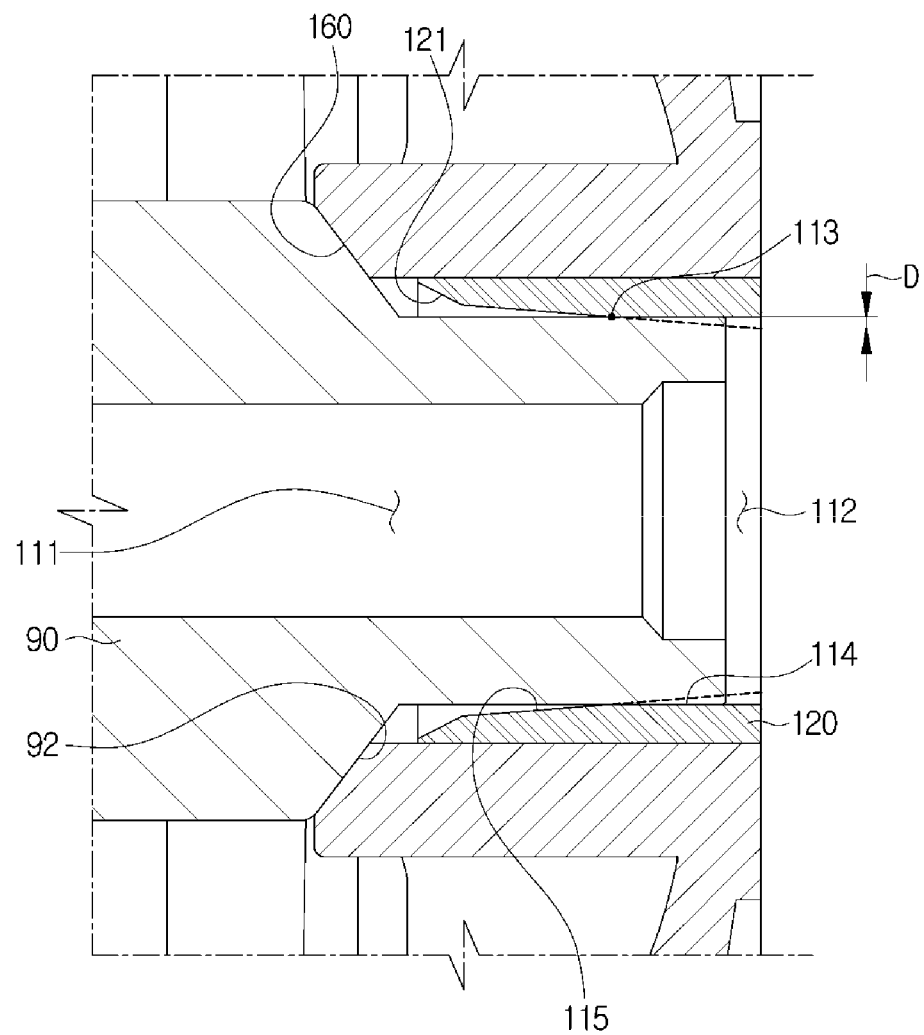
FIG. 9 is a sectional view taken along the line I1-I1 shown in FIG. 7 in a state where a shaft is inserted into the pulley of the washing machine according to an embodiment of the present disclosure.
Figure 10:
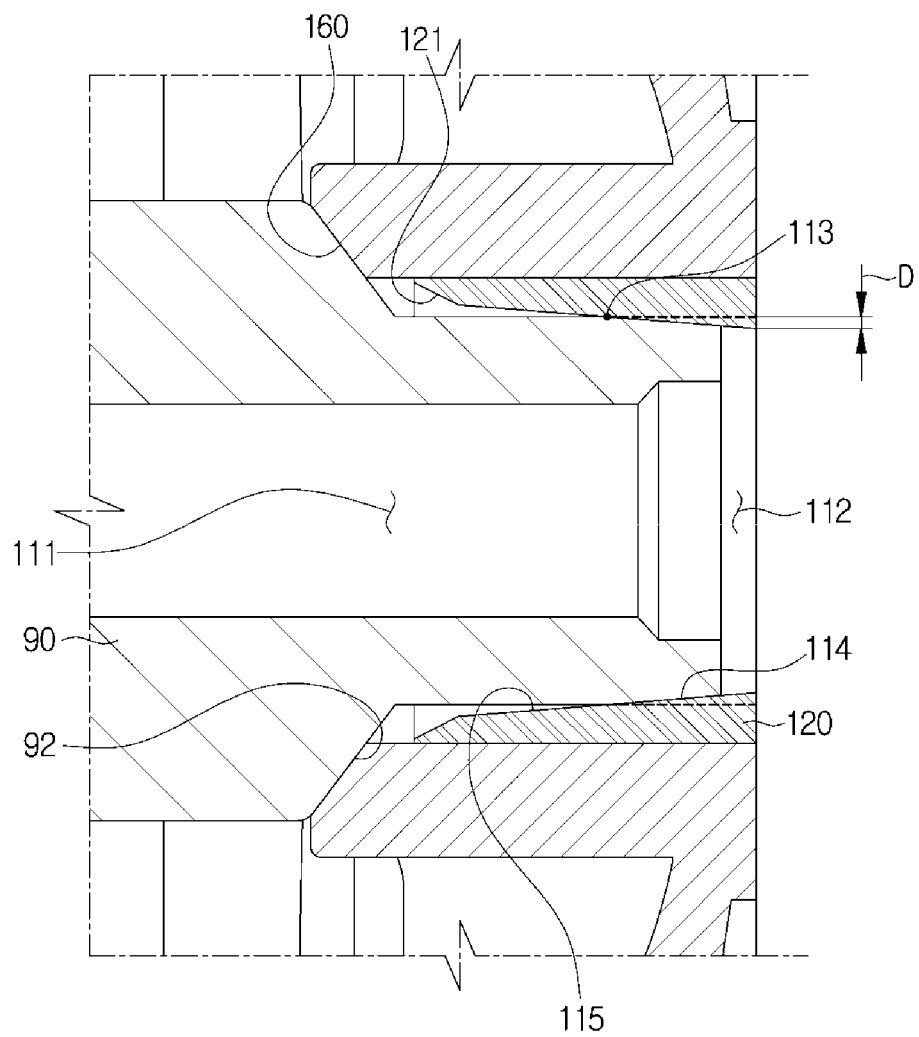
FIG. 10 is a sectional view taken along the line I1-I1 shown in FIG. 7 in a state where a shaft is inserted into the pulley of the washing machine according to another embodiment of the present disclosure.

FIG. 5 is a perspective view illustrating a pulley of the washing machine according to an embodiment, FIG. 6 is a rear-perspective view illustrating the pulley of the washing machine according to an embodiment, FIG. 7 is a rear view illustrating the pulley of the washing machine according to an embodiment, FIG. 8 is a cross-sectional view taken along a line I1-I1 of FIG. 7, FIG. 9 is a cross-sectional view taken along the line I1-I1 of FIG. 7, in a state in which the shaft is inserted into the pulley of the washing machine according to an embodiment, and FIG. 10 is a cross-sectional view taken along a line I1-I1 of FIG. 7, in a state in which a shaft is inserted into a pulley of a washing machine according to another embodiment.

As illustrated in FIG. 5, the pulley 100 includes a shaft insertion hole 110 into which the shaft 90 is inserted, a hub 130 provided in the center of the pulley 100 and provided with the shaft insertion hole 110, and a spoke 150 extended from the hub 130 an outer portion 140 of the pulley 100.

The other end of the shaft 90 may be inserted into the shaft insertion hole 110, wherein one side of the shaft 90 penetrates the tub 20 and the other side of the shaft 90 is extended to the outside. An assembly between the shaft 90 and the shaft insertion hole 110 will be described in detail later.

The outer portion 140 may have a circular shape and the drive belt 60 may be placed on an outer circumferential surface of the outer portion 140. Accordingly, the torque generated by the driving motor 40 may be transmitted to the pulley 100 through the drive belt 60.

The hub 130 may be disposed on the outer side of the shaft insertion hole 110. The hub 130 may have an annular shape along the circumference of the shaft insertion hole 110.

Between the hub 130 and the outer portion 140, the spoke 150 extended in a radial direction of the pulley 100 may be provided. As illustrated in FIG. 5, a plurality of spokes may be provided, but a single spoke 150 among the plurality of spokes 150 will be described as an example.

The shaft insertion hole 110 may have a radius corresponding to a radius of the shaft 90. As the shaft 90 is inserted into and supported by the shaft insertion hole 110, the shaft 90 may be rotated in conjunction with the rotation of the pulley 100. Therefore, the torque may be transmitted to the drum 30 so as to drive the drum 30.

As illustrated in FIG. 6, a first toothed portion 120 may be provided on an inner circumferential surface of the shaft insertion hole 110. When the shaft 90 is coupled to the shaft insertion hole 110, the first toothed portion 120 may be engaged with a second toothed portion 91 provided in the other end of the shaft 90 and then the shaft 90 may be supported by the shaft insertion hole 110 (refer to FIG. 4).

The radius of the shaft insertion hole 110 is provided to correspond to the radius of the shaft 90, as mentioned above. However, due to the error in manufacturing, the radius of the shaft 90 may be manufactured to be greater than the radius of the shaft insertion hole 110, and thus the shaft 90 may be not inserted into the shaft insertion hole 110. Accordingly, according to the conventional manner, the radius of the shaft insertion hole is manufactured to be greater than the radius of the shaft by about 0.1 mm to 0.2 mm. Therefore, in general, a tolerance between the shaft insertion hole and the shaft is about 0.1 mm to 0.2 mm.

Accordingly, since a radius of the first toothed portion is greater than a radius of the second toothed portion, the first toothed portion and the second toothed portion may be not completely engaged with each other. Therefore, when the shaft is inserted into the shaft insertion hole, the shaft may be lowered and thus a tolerance between the upper portion of the shaft and the shaft insertion hole may be increased (0.2~0.3 mm) and a rotation axis of the pulley and a rotation axis may be not identical to each other. Accordingly, concentricity may occur.

Accordingly, when the pulley is rotated, the pulley may be moved in the tolerances, and thus the movement of the pulley may occur. In addition, the noise may occur at a resonance point generated by the movement of the driving belt caused by the rotation of the pulley.

In order to relieve this problem, the pulley 100 according to an embodiment may include an overlapped section in which at least one part of the radius of the shaft insertion hole 110 is overlapped with the radius of the shaft 90.

Therefore, since a section in which the shaft 90 is in contact with the shaft insertion hole 110 without a space, is generated, the concentricity may be minimized and thus the movement of the drive belt 60 may be reduced. Accordingly, it may be possible to reduce the noise caused by the movement of the drive belt 60.

As illustrated in FIG. 8, the shaft insertion hole 110 may be extended obliquely with respect to the rotation axis of the pulley 100. Particularly, the first toothed portion 120 may be extended obliquely with respect to the rotation axis of the pulley 100. Accordingly, a radius of a first opening 111 of the shaft insertion hole 110, into which the shaft 90 is inserted, may be greater than a radius of a second opening 112 disposed on an opposite side to the first opening 111.

In other words, since the first toothed portion 120 is provided in a tapered shape, a cross-sectional area in a direction perpendicular to the rotation axis of the pulley 100 may be reduced as it goes to the second opening 112.

Therefore, as illustrated in FIG. 9, when the shaft 90 is inserted into the shaft insertion hole 110, a contact point 113 in which the radius of the shaft 90 is identical to the radius of the shaft insertion hole 110 may be formed on one side of the shaft insertion hole 110, and a first section 114 in which an overlapped portion D, in which the radius of the shaft 90 is greater than the radius of the shaft insertion hole 110, may be formed.

As described above, since the radius of the shaft 90 is greater than the radius of the shaft insertion hole 110 in the first section 114, the shaft 90 may be inserted into the shaft insertion hole 110 by using an interference fit method.

In the first section 114, since the shaft 90 and the shaft is brought into close contact with the shaft insertion hole 110, the tolerance may not occur between the outer circumferential surface of the shaft 90 and the inner circumferential surfaces of the shaft insertion holes 110.

In the first section 114, the radius of the shaft 90 may be greater than the radius of the shaft insertion hole 110 by approximately 0.1 mm and thus the overlapped portion D may be generated.

In the first section 114, the inner circumferential surface of the pulley 100 may be pressed in a shape corresponding to the outer circumferential surface of the shaft 90 so that the shaft 90 and the shaft insertion hole 110 are closely contacted to each other.

When the interference fit is performed between the shaft 90 and the shaft insertion hole 110, the shape of the shaft insertion hole 110 may be deformed since the pulley 100 is weaker than the shaft 90. As illustrated in FIG. 9, a part of the inner circumferential surface of the shaft insertion hole 110 may be deformed to have a shape corresponding to the outer circumferential surface of the shaft 90 by the shaft 90.

However, the strength of the pulley 100 is not limited thereto and thus the strength of the pulley 100 may be higher than the strength shaft 90. At this time, as illustrated in FIG. 10, in the first section 114, the shaft 90 may be deformed to have a shape corresponding to an inclination of the shaft insertion hole 110 due to the interference fit.

The inner circumferential surface of the shaft insertion holes 110 itself may have a tapered shape as described above, but according to an embodiment, the first toothed portion 120 may have a tapered shape and provided to be inclined against the second toothed portion 91 of the shaft 90.

Particularly, since the inner circumferential surface of the shaft insertion holes 110 is parallel to the rotation axis of the pulley 100, and the first toothed portion 120 has the tapered shaped on the inner circumferential surface of the shaft insertion holes 110, the first toothed portion 120 may be inclined with respect to the rotation axis of the pulley 100.

Therefore, in the first section 114, which is disposed between the contact point 113 on the first toothed portion 120 and the second opening 112, the first toothed portion 120 and the second toothed portion 91 may be engaged with each other by the interference fit method.

Between the contact point 113 and the first opening 111, a second section 115, in which a tolerance is generated between the shaft 90 and the shaft insertion hole 110, may be formed. Although the tolerance is generated between the shaft 90 and the shaft insertion hole 110, the shaft 90 may be supported against the shaft insertion hole 110 while being in contact with the shaft insertion hole 110, in the first section 114. Therefore, the shaft 90 may be disposed in the lower side and the tolerance may be not increased more and the shaft 90 may be disposed on the rotation axis of the pulley 100 so that it may be possible to reduce the movement of the drive belt 60.

In other respects, the first and second teethed portions 120 and 91 may have a teethed shape such that a crest, which is convex portion, and a root, which is concave portion, are alternately provided, wherein a radius of at least one part forming the crest of the first toothed portion 120 is smaller than a radius forming the crest of the second toothed portion 91.

That is, in the contact point 113, the radius forming the crest of first and second teethed portions 120 and 91 are the same, and in the first section 114, the radius forming the crest of the first toothed portion 120 is smaller than the radius forming the crest of the second toothed portion 91. Accordingly, with respect to the radial direction of the pulley 100, the section in which the shaft 90 and the shaft insertion hole 110 are overlapped may be formed.

In the second section 115, the radius forming the crest of the first toothed portion 120 is greater than the radius forming the crest of the second toothed portion 91 and thus the tolerance may be generated between the first toothed portion 120 and the second toothed portion 91.

A guide surface 121 configured to guide the engagement between the other end of the shaft 90 corresponding to the second toothed portion 90 and the first toothed portion 120 may be provided in the side adjacent to the first opening 111 of the first toothed portion 120 (refer to FIG. 6).

Particularly, since the guide surface 121 is extended obliquely with respect to the rotation axis of the pulley 100, one side of the shaft 90 may be in contact with the guide surface 121 and the shaft 90 may be inserted along the guide surface 121 so that the second toothed portion 91 is smoothly inserted into the inside of the first toothed portion 120.

However, as described above, since the first toothed portion 120 itself is inclined with respect to the rotation axis of the pulley 100, the guide surface 121 may be more inclined than the inclination formed by the first toothed portion 120.

In a rim of the first opening 111, a taper portion 160 having a tapered shape may be provided obliquely in the radial direction of the pulley 100 (refer to FIG. 6).

A part of the shaft 90 extended outwardly of the second toothed portion 91 may be in surface contact with the pulley 100 by the taper portion 160.

According to the conventional manner, the first opening side of the shaft insertion hole is disposed in a vertical shape or disposed in a shape approximately similar with the vertical shape and thus one side of the shaft 90 may be coupled to the pulley in a linear manner. Therefore, there may be reduction in the assembling stiffness between the shaft and pulley.

However, according to an embodiment, as illustrated in FIGS. 8 to 10, since the taper portion 160 is provided at the rim of the first opening 111, the shaft 90 and the pulley 100 may be in surface contact with each other and thus the assembling stiffness of the pulley 100 and the shaft 90 may be improved.

A contact portion 92 having an inclination corresponding to the taper portion 160 may be provided in one side in which the shaft 90 is in contact with the taper portion 160, and thus the taper portion 160 may be in contact with the shaft 90 without a space.

Hereinafter, the spoke 150 of the pulley 100 will be described in detail.

Figure 11A:
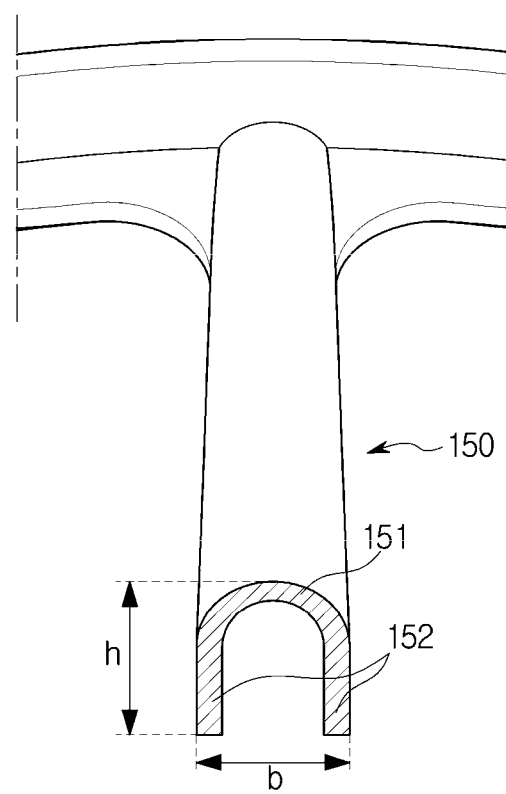
FIG. 11A is a sectional view taken along the line I2-I2 shown in FIG. 7.
Figure 11B:
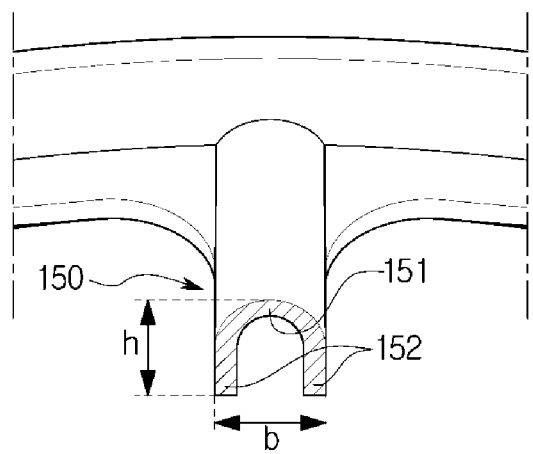
FIG. 11B is a sectional view taken along the line I3-I3 shown in FIG. 7.

FIG. 11A is a cross-sectional view taken along a line I2-I2 of FIG. 7, and FIG. 11B is a cross-sectional view taken along a line I3-I3 of FIG. 7.

As illustrated in FIG. 7, the spoke 150 may include a curved portion 151 extended from the hub 130 to the outer portion 140. In other words, the curved portion 151 may be extended in the radial direction while having a curved surface, which is convex in a direction perpendicular to the radial direction of the pulley 100.

Particularly, the spoke 150 may include a pair of extended portions 152 extended in the direction of the rotation axis of the pulley 100, and the curved portion 151 provided with a curved surface configured to connect each end of the extended portions 152.

As the pulley 100 is rotated in the circumferential direction by the drive belt 60, the spoke 150 may produce the friction with the flow of air, wherein the air flows from the rotational direction of the pulley 100 to the opposite direction of rotation. Therefore, the air noise may be generated.

Since the spoke 150 according to an embodiment includes the curved portion 151 extended from the rotational direction of the pulley 100 to the opposite direction of rotation, it may be possible to allow the air to smoothly flow in the spoke 150 without the limitation of the flow of air, so as to reduce the noise caused by the friction with the air.

That is, by placing the curved portion 151 having a curved surface rounded to the direction of the flow of air, and by allowing a friction surface, in which the spoke 150 and the air are collided with each other, to have a curved shape, it may be possible to guide the flow of air so that the air flows along the curved surface.

As illustrated in FIG. 11A, a cross section of the spoke 150 may be provided in a 'U' shape. The spoke 150 may include the pair of extended portions 152 extended in the direction of the rotation axis of the pulley 100, and the curved portion 151 configured to connect each end of the extended portions 152 and formed in a rounded surface. However, the configuration of the pair of extended portions 152 is not limited thereto, and thus a length of the pair of the extended portions 152 may vary according to the size of the pulley 100.

when it is assumed that one side of the spoke 150 adjacent to the hub 130 is referred to as a first portion 155, and the other side of the spoke 150 adjacent to the outer portion 140 is referred to as a second portion 156, as illustrated in FIGS. 11A and 11B, a cross sectional area of the first portion 155 of the spoke 150 may be greater than a cross sectional area of the second portion 156.

The shaft 90 is connected at the rear side of the drum 30 to rotate the drum 30 while serving to support the drum 30. In addition, the shaft 90 supports the pulley 100 while transmitting a torque to the drum. At this time, a stress may be generated in the vertical direction of the shaft 90 by the weight of the drum 30 and the pulley 100 since the shaft 90 supports one side of the drum 30 and the pulley 100. In addition, the stress may be generated in the circumferential direction of the shaft 90 upon the rotation of the drum 30.

The stress generated in the shaft 90 may be transmitted to the hub 130 adjacent to the shaft 90. Accordingly, when the stiffness design corresponding to the stress, which is transmitted from the hub 130, is not provided, the shape of the hub 130 may be deformed or broken and thus it may cause the reduction in the reliability of the operation of the washing machine and cause a large noise during the operation.

Therefore, in order to improve the stiffness of the hub 130, the cross sectional area of the first portion 155 may be increased. As described above, since the stress, which is generated in the shaft 90, is most transmitted to the hub 130, the stiffness design against the stress may be required.

As for injection of the pulley 100, when the first portion 155 has a greater weight than a weight of the second portion 156, it may be possible to secure a greater stiffness than a case in which the cross sectional area of the first portion 155 and the second portion 156 are configured to be the same and then injected.

Particularly, according to an embodiment, when the second portion 156 having the same weight as the first portion 155 is injected, the cross-sectional area of the first portion 155 may be reduced as much as the cross sectional area of the second portion 156 is increased. Therefore, the mass or the volume of the first portion 155 may be reduced and thus it may be difficult to secure the stiffness as much as the reduction of the mass or the volume.

Therefore, according to an embodiment, in order to overcome the stress transmitted to the first portion 155, an overall thickness of the first portion 155 may be further increased or the cross sectional area of the first portion 155 may be increased. Accordingly, the weight of the raw material, which is needed to produce the entire pulley 100, may be increased and the production cost may be increased, and thus the weight of the entire washing machine 1 may be increased.

However, when the cross sectional area of the first portion 155 is greater than the cross sectional area of the second portion 156 according to an embodiment, it may be possible to secure the greater stiffness than a case in which the cross sectional area of the first portion 155 and the second portion 156 are the same. Accordingly, it may be possible to reduce the weight of the washing machine and reduce the cost.

Accordingly, according to an embodiment, the spoke 150 may have a taper shape in which the cross-sectional area thereof is reduced from the hub 130 to the outer portion 140. However, the shape of the spoke 150 is not limited thereto, and thus the spoke 150 may be formed to be extended from the hub 130 to the outer portion 140 in a stepped shape in which a step is formed between the first portion 155 and the second portion 156.

As illustrated in FIGS. 11A and 11B, as for the cross section of the first and second portions 155 and 156, when a direction the same as the rotation axis of the pulley 100 is defined as a first direction, a first direction length of the cross section, which is extended in the first direction, is defined as h, a direction the same as the rotational direction of the pulley 100 is defined as a second direction, and a second direction length of the cross section, which is extended in the second direction, is defined as b, with respect to a reduction ratio of the cross sectional area, which is reduced from the first portion 155 to the second portion 156, a reduction ratio of the second direction length (b) may be greater than a reduction ratio of the first direction length (h).

With respect to the cross-section moment of inertia (I), the stiffness of the cross section may be increased as the first direction length (h) is increased. Therefore, when it is required to reduce the cross section thereof, it may be appropriate that the second direction length (b) is more reduced than the first direction length (h), and thus it may be possible to minimize the reduction in the magnitude of the stiffness, wherein the reduction is performed according to the reduction in the cross section.

That is, the cross-section moment of inertia (I) or second cross section moment value may represent a value that quantifies the magnitude of stiffness having a cross-sectional area with respect to any cross-sectional area, and a rectangular cross-section may be calculated by using a formula in the followings.

A formula is as follows.

$$I = \frac{b \times h^3}{12}$$

Therefore, since the cross section of the first and second portions 155 and 156 are approximately formed by the extended portion 152, the cross-section moment of inertia (I) may be increased as a value about the first direction length (h) corresponding to a height (h) of the extended portion is increased.

Accordingly, a cross section may have a greater stiffness as a value of the first direction length (h) is increased. Therefore, when the second direction length (b) is more reduced than the first direction length (h) in a state in which the cross section is reduced from the first portion 155 to the second portion 156, it may be possible to minimize the reduction in the magnitude of the stiffness, wherein the reduction is performed according to the reduction in the cross section.

Therefore, the overall cross-section of the spoke 150 may be provided such that the value of the first direction length (h) is greater than a value of the second direction length (b). In addition, as for the reduction in the cross section, the cross-section of the spoke 150 may be provided such that the reduction ratio of the second direction length (b) is greater than the reduction ratio of the first direction length (h).

When the stiffness of the cross section of the spoke 150 is designed to be strong, the stiffness against the friction with the air may be increased, wherein the friction with the air is generated by the rotation of the pulley 100. As the stiffness is increased, the number of vibrations of the spoke 150, which is generated by the friction with the air, may be reduced and thus it may be possible to reduce the generation of the noise caused by the vibration of the pulley 100. Accordingly, as the stiffness of the cross section of the spoke 150 is increased, it may be possible to more effectively reduce the noise.

Hereinafter, a spoke 150 according to another embodiment will be described. Configurations other than the configuration of the spoke 150 are the same as the above mentioned embodiment and thus a description thereof will be omitted.

Figure 12:
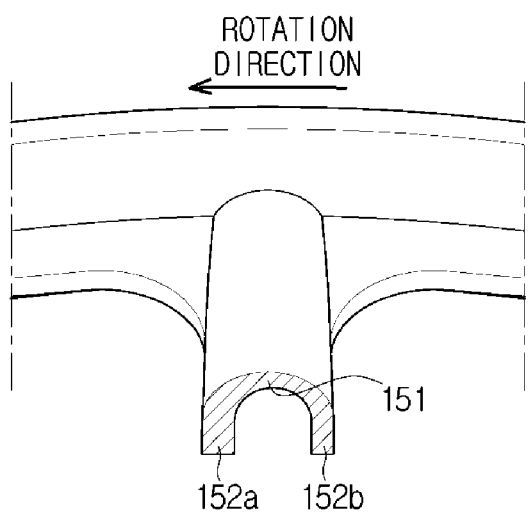
FIG. 12 is a sectional view taken along the line I2-I2 shown in FIG. 7 according to another embodiment of the present disclosure.
Figure 13:
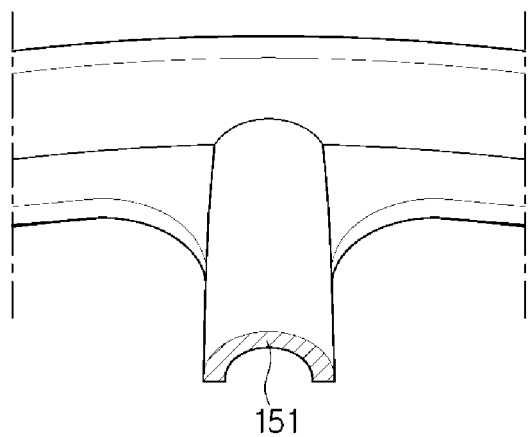
FIG. 13 is a cross-sectional view taken along the line I2-I2 shown in FIG. 7 according to another embodiment of the present disclosure.
Figure 14:
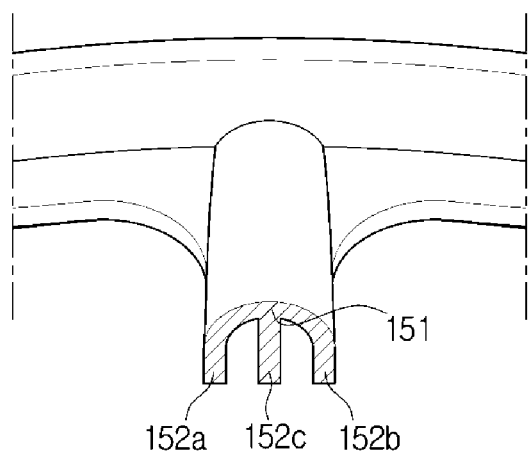
FIG. 14 is a cross-sectional view taken along the line I2-I2 shown in FIG. 7 according to another embodiment of the present disclosure.

FIG. 12 is a cross-sectional view taken along a line I2-I2 of FIG. 5 according to another embodiment, FIG. 13 is a cross-sectional view taken along a line I2-I2 of FIG. 5 according to still another embodiment, and FIG. 14 is a cross-sectional view taken along a line I2-I2 of FIG. 5 according to still another embodiment.

A cross section of the spoke 150 may include the curved portion 151 to reduce the resistance of air, but the shape of the curved portion 151 is not limited thereto. Therefore, the curved portion 151 may have a variety of shapes.

As illustrated in FIG. 12, the pair of extended portions 152 may be formed such that a first extended portion 152a, which is disposed in the rotational direction of the pulley 100 and in which the friction with air firstly occurs, and a second extended portion 152b disposed on one side opposite to the first extended portion 152 are provided, wherein a thickness of the first extended portion 152a is different from a thickness of the second extended portion 152b.

The thickness of the first extended portion 152a may be relatively great so that the stiffness of the first extended portion 152a is greater than the second extended portion 152b. As described above, when the stiffness of the first extended portion 152a is small since the first extended portion 152a directly faces the air, the noise may be generated by the vibration caused by the aerodynamics.

In order to prevent this, the thickness of the first extended portion 152a is relatively great to increase the stiffness so as to reduce the vibration caused by the friction of air, and thus it may be possible to effectively reduce the noise caused by the vibration.

As illustrated in FIG. 13, the spokes 150 may not include the extended portion 152. When the pulley 100 is miniaturized due to the capacity of the drum 30, the weight for forming the extended portion 152 is minimized so that the weight of the pulley 100 may be reduced.

In addition, as illustrated in FIG. 14, the spoke 150 may include a pair of extended portions 152a and 152b, and further may include a third extended portion 152c disposed between the pair of extended portions 152a and 152b, and extended to the lower side of the curved portion 151.

Since the third extended portion 152c is disposed between the pair of extended portions 152a and 152b, it may be possible to increase the stiffness by increasing the cross sectional area of the spoke 150. In addition, since the third extended portion 152c is disposed in an inner side of the outer side formed by the pair of extended portions 152a and 152b, and the outer circumferential surface of the curved portion 151, it may be possible to reduce the increase of the air resistance caused by the increase of the cross sectional area.

While the present disclosure has been particularly described with reference to exemplary embodiments, it should be understood by those of skilled in the art that various changes in form and details may be made without departing from the spirit and scope of the present disclosure.

The invention claimed is:

1. A washing machine comprising:
a body;
a drum rotatably installed inside the body;
a pulley configured to transmit a torque to the drum; and
a shaft configured to connect the drum to the pulley,
wherein the pulley comprises a shaft insertion hole having a first opening into which the shaft is inserted and a second opening,
wherein the shaft insertion hole comprises an inner circumferential surface extended obliquely with respect to a rotation axis of the pulley, and
wherein, when the shaft is coupled to the shaft insertion hole by being inserted into the shaft insertion hole, the shaft contacts the inner circumferential surface of the shaft insertion hole at the second opening and is free from contact with the inner circumferential surface of the shaft insertion hole at the first opening.

2. The washing machine of claim 1, wherein:
the shaft insertion hole comprises a first toothed portion provided in the inner circumferential surface of the shaft insertion hole,
the shaft comprises a second toothed portion disposed on an outer circumferential surface of one side of the shaft, the second toothed portion configured to be inserted into the shaft insertion hole and to be engaged with the first toothed portion, and
the first toothed portion comprises an inner circumferential surface extended obliquely with respect to the rotation axis of the pulley.

3. The washing machine of claim 2, wherein the first toothed portion has a tapered shape.

4. The washing machine of claim 2, wherein, when the shaft is coupled to the shaft insertion hole by being inserted into the shaft insertion hole, at least one part of the first toothed portion is not in contact with the second toothed portion.

5. The washing machine of claim 2, wherein each of the first toothed portion and the second toothed portion comprise:
a crest protruding to the outside; and
a root concave to the inside,
wherein a radius of at least one part of the crest of the first toothed portion is smaller than a radius of the crest of the second toothed portion.

6. The washing machine of claim 2, wherein the first toothed portion comprises a guide surface disposed in a direction into which the shaft is inserted, and formed in a diagonal shape to guide an insertion of the shaft.

7. The washing machine of claim 1, wherein:
the pulley comprises a hub provided with the shaft insertion hole, and a spoke extended from the hub in a radial direction of the pulley, and
the spoke comprises a curved portion extended to the radial direction of the pulley.

8. The washing machine of claim 7, wherein the curved portion comprises a curved surface convex in a direction perpendicular to the radial direction of the pulley.

9. The washing machine of claim 7, wherein:
the spoke comprises a pair of extended portions extended in a direction of the rotation axis of the pulley, and
each end of the pair of extended portions is connected by the curved portion.

10. The washing machine of claim 9, wherein:
the pair of extended portions comprise a first extended portion provided in a rotational direction of the pulley and a second extended portion facing the first extended portion with a space interposed therebetween, and
a width of the first extended portion is greater than a width of the second extended portion.

11. The washing machine of claim 10, wherein the spoke further comprises a third extended portion extended from an inner circumferential surface of the curved portion and disposed between the pair of extended portions.

12. The washing machine of claim 7, wherein:
the spoke comprises a first portion adjacent to the hub and a second portion adjacent to an outer side of the pulley, and
a cross sectional area of the first portion in a direction of the rotation axis of the pulley is greater than a cross sectional area of the second portion in the direction of the rotation axis of the pulley.

13. The washing machine of claim 12, wherein, when a direction toward the rotation axis of the pulley is defined as a first direction and a direction perpendicular to the rotation axis of the pulley is defined as a second direction, a cross section of the first portion is formed such that a length in the first direction is greater than a length in the second direction.

14. A washing machine comprising:
a body;
a drum rotatably installed inside the body;
a pulley configured to transmit a torque to the drum; and
a shaft configured to connect the drum to the pulley,
wherein the pulley comprises a shaft insertion hole having a first opening into which the shaft is inserted and a second opening,
wherein the shaft insertion hole comprises an inner circumferential surface extended obliquely with respect to a rotation axis of the pulley,
wherein the shaft insertion hole comprises a taper portion disposed on one side into which the shaft is inserted, and extended obliquely and outwardly with respect to the rotation axis of the pulley, and
wherein, when the shaft is coupled to the shaft insertion hole by being inserted into the shaft insertion hole, the shaft contacts the inner circumferential surface of the shaft insertion hole at the second opening and is free from contact with the inner circumferential surface of the shaft insertion hole at the first opening.

15. The washing machine of claim 14, wherein the taper portion is in surface contact with the shaft when the shaft is inserted in the shaft insertion hole.

16. The washing machine of claim 14, wherein:
the shaft insertion hole comprises a first toothed portion provided in the inner circumferential surface of the shaft insertion hole,
the shaft comprises a second toothed portion disposed on an outer circumferential surface of one side of the shaft, the second tooth portion configured to be inserted into the shaft insertion hole and to be engaged with the first toothed portion, and
the first toothed portion comprises an inner circumferential surface extended obliquely with respect to the rotation axis of the pulley.

17. The washing machine of claim 16, wherein the first toothed portion has a tapered shape.

18. The washing machine of claim 16, wherein, when the shaft is coupled to the shaft insertion hole by being inserted into the shaft insertion hole, at least one part of the first toothed portion is not in contact with the second toothed portion.

19. The washing machine of claim 16, wherein each of the first toothed portion and the second toothed portion comprise:
- a crest protruding to the outside; and
- a root concave to the inside,
- wherein a radius of at least one part of the crest of the first toothed portion is smaller than a radius of the crest of the second toothed portion.

20. The washing machine of claim 16, wherein the first toothed portion comprises a guide surface disposed in a direction into which the shaft is inserted, and formed in a diagonal shape to guide an insertion of the shaft.

* * * * *